Feb. 21, 1967 J. B. STECK ETAL 3,305,228
DOUBLE ACTION POWER ACTUATOR
Filed Nov. 30, 1964
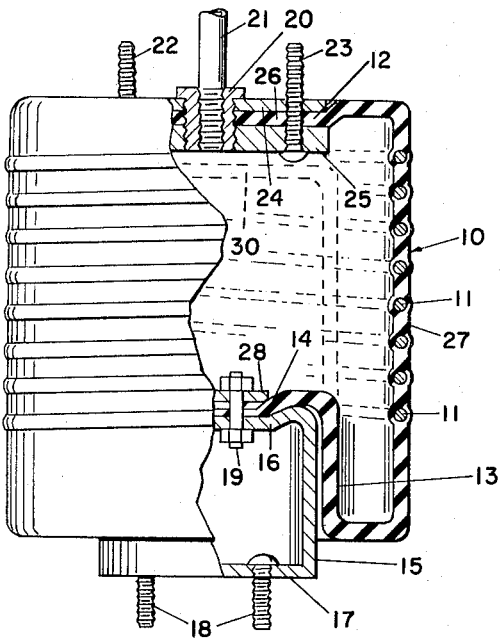
INVENTORS
JOSEPH B. STECK
BY DONALD H. SLATER

United States Patent Office 3,305,228
Patented Feb. 21, 1967

3,305,228
DOUBLE ACTION POWER ACTUATOR
Joseph B. Steck, R.D. 1, Hadley, Pa. 16130, and Donald
H. Slater, R.D. 1, Fredonia, Pa. 16124
Filed Nov. 30, 1964, Ser. No. 414,770
1 Claim. (Cl. 267—1)

This invention relates to a fluid pressure actuated device known in the trade as a power actuator, and has particular application in fluid-operated brake systems, air springs, and the like, in which the booster serves to translate fluid pressure into mechanical force.

It is an object of this invention to provide a power actuator having an improved side wall that makes is possible to make the entire air bag arrangement out of a single integral piece of flexible material having a helical spring or individual coils imbedded therein, whichever the need may be.

Another object of the invention is to provide a double power actuator which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

The figure is a side view partly in cross section of the power actuator according to the invention.

Now with more particular reference to the drawing, the power actuator shown is made up of the air bag 10, which has integral closed ends 12 and 14, which are fixed to the base support 15 and the rigid member at the opposite end made up of circular plates 24 and 25.

The flexible material of the end 26 of the bag is sandwiched between the circular plate 24 and the circular plate 25, thus forming a first rigid member fixed to the end 26. The rigid plates 24 and 25 have the bolts 22 and 23 extending therethrough, and these bolts 22 and 23 may be used to attach the rigid member made up of plates 24 and 25 to a fixed support on a truck or the like. The plates 24 and 25 have a threaded hole in the center thereof and in this threaded hole the bushing 20 is inserted, and into this bushing the threaded end of pipe 21 is attached. The pipe 21 may be used to admit air into said bag and to remove air from the bag to control the pressure therein.

The air bag has the generally cylindrical side wall 27, which is integrally attached to the end 12 and the end 14. The bag itself may be made of a flexible material, such as molded plastic, polyethylene, rubber, or any other suitable material.

The helical wire 11 is wound in a coil, and it may be a spring wire which will help hold the side wall 27 in extended position. The wire 11 could be in the form of spaced rings. It will be noted that the wire 11 will terminate approximately between the end 12 and the end 14, a distance sufficient to allow the bag to fold back on itself during operation, when the end 14 is fully extended.

The end 14 is attached to the rigid member 15, and the rigid member may be attached to a member that is movable relative to the end 12. The end 14 is sandwiched between the dished end 16 and the plate 28, and the plate 28 is held to the end 16 by means of bolts 19. It will be noted that the portion 13 of the wall is telescoped into the part of the wall having the wire imbedded therein, and as the pressure is reduced inside the air bag, or vacuum applied, the end 14 may move up to the dotted line position 30. When air is put into the bag under pressure, the bag will extend in the usual manner.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A fluid pressure power actuator comprising
an air bag made of flexible material,
said air bag being in the form of an elongated hollow flexible member,
a first rigid member fixed to a first end,
a second rigid member fixed to said second end,
means on said first rigid member to fix said rigid member to a fixed member,
means on said second rigid member to fix it to a member movable relative to said fixed member,
conduit means connected to said first rigid member to admit a fluid under pressure into said air bag,
a generally rigid member imbedded in the side wall of said air bag extending entirely around it,
said rigid member having a first and a second end,
said first end of said rigid member being disposed adjacent said first end of said bag,
said second end of said rigid member terminating at a position between said first and said second ends a distance sufficient to allow said second end to move toward said first end,
said second end being adapted to move into said air bag toward said first end when the pressure of fluid in said bag is reduced said second end being smaller than the inside lateral dimension of said side wall, said side wall being generally cylindrical in shape.

References Cited by the Examiner
UNITED STATES PATENTS

| | | | |
|---|---|---|---|
| 2,790,650 | 4/1957 | Baschi | 267—34 X |
| 2,822,165 | 2/1958 | Baschi | 267—33 |
| 3,118,659 | 1/1964 | Paulsen | 267—35 |

ARTHUR L. LA POINT, *Primary Examiner.*
R. M. WOHLFARTH, *Assistant Examiner.*